United States Patent
Ozyhar et al.

(10) Patent No.: US 10,086,532 B2
(45) Date of Patent: Oct. 2, 2018

(54) FIBER BOARD PRODUCT COMPRISING A CALCIUM CARBONATE-CONTAINING MATERIAL

(71) Applicant: Omya International AG, Oftringen (CH)

(72) Inventors: Tomasz Ozyhar, Zürich (CH); Johannes Kritzinger, Olten (CH); Philipp Hunziker, Böckten (CH)

(73) Assignee: Omya International AG, Oftringen (CH)

( * ) Notice: Subject to any disclaimer, the term of this patent is extended or adjusted under 35 U.S.C. 154(b) by 54 days.

(21) Appl. No.: 15/305,770

(22) PCT Filed: Apr. 28, 2015

(86) PCT No.: PCT/EP2015/059193
§ 371 (c)(1),
(2) Date: Oct. 21, 2016

(87) PCT Pub. No.: WO2015/173008
PCT Pub. Date: Nov. 19, 2015

(65) Prior Publication Data
US 2017/0057118 A1 Mar. 2, 2017

Related U.S. Application Data

(60) Provisional application No. 62/001,716, filed on May 22, 2014.

(30) Foreign Application Priority Data

May 15, 2014 (EP) ..................................... 14168478

(51) Int. Cl.
*B27N 3/04* (2006.01)
*B27N 3/08* (2006.01)
(Continued)

(52) U.S. Cl.
CPC ............... *B27N 3/04* (2013.01); *B27N 3/002* (2013.01); *B27N 3/08* (2013.01); *C04B 26/122* (2013.01);
(Continued)

(58) Field of Classification Search
None
See application file for complete search history.

(56) References Cited

U.S. PATENT DOCUMENTS 5,422,170 A 6/1995 Iwata et al.
5,679,219 A 10/1997 Harms et al.
(Continued)

FOREIGN PATENT DOCUMENTS

CA 2363357 5/2002
CN 103317585 A 9/2013
(Continued)

OTHER PUBLICATIONS

Machine Translation, WO 2015/146964. (Year: 2015).*
(Continued)

*Primary Examiner* — Catherine S Branch
(74) *Attorney, Agent, or Firm* — Amster, Rothstein & Ebenstein LLP

(57) ABSTRACT

The present invention relates to a fiber board product comprising fibers in an amount from 50.0 to 99.0 parts by weight (d/d), at least one particulate calcium carbonate-containing material in an amount from 1.0 to 50.0 parts by weight (d/d), at least one binder in an amount from 0.05 to 25.0 parts by weight (d/d), at least one wax in an amount from 0 to 5.0 parts by weight (d/d), wherein the sum of the fibers and the at least one particulate calcium carbonate-containing material is 100.0 parts by weight (d/d), a process for manufacturing such a fiber board product as well as an use of at least one particulate calcium carbonate-containing (Continued)

material having a weight median particle size $d_{50}$ of 0.5 to 150.0 μm as fiber replacement in a fiber board product, preferably in a high-density fiber (HDF) board, medium-density fiber (MDF) board, low-density fiber (LDF) board or particle board.

33 Claims, 3 Drawing Sheets

(51) Int. Cl.

| | | |
|---|---|---|
| B27N 3/00 | (2006.01) | |
| D21J 1/04 | (2006.01) | |
| C08L 97/02 | (2006.01) | |
| C04B 26/12 | (2006.01) | |
| C04B 26/14 | (2006.01) | |
| C04B 26/16 | (2006.01) | |

(52) U.S. Cl.
CPC .......... *C04B 26/125* (2013.01); *C04B 26/127* (2013.01); *C04B 26/14* (2013.01); *C04B 26/16* (2013.01); *C08L 97/02* (2013.01); *D21J 1/04* (2013.01); *Y02W 30/97* (2015.05)

(56) References Cited

U.S. PATENT DOCUMENTS

| | | |
|---|---|---|
| 5,705,001 A | 1/1998 | Iwata et al. |
| 2004/0258898 A1 | 12/2004 | Hume |
| 2005/0066622 A1 | 3/2005 | Lee et al. |
| 2010/0183890 A1 | 7/2010 | Wicher |
| 2013/0323497 A1 | 12/2013 | Ullrich et al. |

FOREIGN PATENT DOCUMENTS

| | | | |
|---|---|---|---|
| DE | 4310191 A1 | 10/1993 | |
| DE | 102006021263 A1 | 11/2007 | |
| EP | 0705939 A1 | 4/1996 | |
| EP | 1036881 A1 | 9/2000 | |
| FR | 873445 A | 7/1942 | |
| JP | 2009023095 A | 2/2009 | |
| TR | 201214779 | 7/2014 | |
| WO | 9837032 A1 | 8/1998 | |
| WO | 03099539 A1 | 12/2003 | |
| WO | 2005030671 A1 | 4/2005 | |
| WO | 2006016416 A1 | 2/2006 | |
| WO | 2006042651 A1 | 4/2006 | |
| WO | 2006111458 A1 | 10/2006 | |
| WO | 2009074491 A1 | 6/2009 | |
| WO | 2012019124 A2 | 2/2012 | |
| WO | 2012038076 A1 | 3/2012 | |
| WO | WO-2015146964 A1 * | 10/2015 | ........... D21H 17/675 |

OTHER PUBLICATIONS

Chemical Abstracts, Chemical Abstracts Service (CAS) US—Sep. 20, 1982, p. 327.
International Search Report dated Aug. 11, 2015 for PCT/EP2015/059193.
Written Opinion of International Searching Authority dated Aug. 11, 2015 for PCT/EP2015/059193.
Acceptance Summary dated Feb. 9, 2017 for Australian patent application No. 2015261212.
Office action dated Jan. 15, 2018 for Canadian patent application No. 2,947,439.
Office action dated Nov. 10, 2016 for Chilean patent application No. 201602869.
Office action dated Feb. 9, 2018 for Chinese patent application No. 201580025145.X.
European Search Report dated Nov. 7, 2014 for European patent application No. 14168478.7.
Office action dated Oct. 31, 2017 for Japanese patent application No. 2016-567832.
Office action dated Nov. 8, 2017 for Korean patent application No. 10-2016-7034573.
Decision to Grant dated Mar. 12, 2018 for Russian patent application No. 2016149094.
Office action dated Mar. 5, 2016 for Taiwan patent application No. 104112363.
International Preliminary Report on Patentability dated Nov. 24, 2016 for PCT patent application No. PCT/EP2015/059193.
Office action dated May 18, 2018 for Colombian patent application No. NC2016/0003943.

* cited by examiner

FIBER BOARD PRODUCT COMPRISING A CALCIUM CARBONATE-CONTAINING MATERIAL

CROSS-REFERENCE TO RELATED APPLICATIONS

This is a U.S. national phase of PCT Application No. PCT/EP2015/059193, filed Apr. 28, 2015, which claims priority to European Application No. 14168478.7, filed May 15, 2014 and U.S. Provisional Application No. 62/001,716, filed May 22, 2014.

The present invention relates to a fiber board product comprising fibers in an amount from 50.0 to 99.0 parts by weight (d/d, dry/dry), at least one particulate calcium carbonate-containing material in an amount from 1.0 to 50.0 parts by weight (d/d), at least one binder in an amount from 0.05 to 25.0 parts by weight (d/d), at least one wax in an amount from 0 to 5.0 parts by weight (d/d), wherein the sum of the fibers and of the at least one particulate calcium carbonate-containing material is 100.0 parts by weight (d/d), a process for manufacturing such a fiber board product as well as an use of at least one particulate calcium carbonate-containing material having a weight median particle size $d_{50}$ of 0.5 to 150.0 µm as fiber replacement in a fiber board product, preferably in a high-density fiber (HDF) board, medium-density fiber (MDF) board, low-density fiber (LDF) board or particle board.

Fiber board products such as medium-density fiberboards (MDF) and high-density fibreboards (HDF) are widely used for indoor applications such as in furniture, doors, decorative wall lining, flooring or separation walls due to their consistency in strength, dimension stability, low split tendency, elastic properties and easiness of finishing. Such fiber board products are composite products comprising mainly wood fibers which are joined together, typically by using a binder, under heat and pressure. Such products and methods for preparing same are described in a number of documents. For instance, WO 2006/042651 A1 refers to light-colored to white wooden material panels being produced from bleached wood fibers and/or vat-dyed with a white pigment. DE 43 10 191 A1 relates to wood-based panel boards including inorganic cellular materials and flame retardant. The inorganic cellular material comprises a cellular material made from inorganic materials. For example, these may be materials having an inorganic oxide such as silicon oxide or aluminum oxide as the principle component, with a granular structure filled with minute closed cells. U.S. Pat. No. 5,422,170 A and U.S. Pat. No. 5,705,001 A refer to wood based panels for which wood fiber, inorganic cellular material, flame retardant and an organic binder for binding these materials, are mixed together and hot press formed to give the wood based panel. WO 2006/016416 A1 relates to a nonflammable MDF obtained by forming an air-permeable inorganic coating film having a thickness of 0.2 to 2 mm on a surface of an MDF (medium-density fiber board) obtained by adding a fire retardant, as well as wood fiber and an adhesive, and forming by hot pressing, when produced. WO 2006/111458 A1 refers to a high pressure laminate including a first layer of resin impregnated paper and at least one layer of fiber reinforced veil. WO 2012/038076 A1 refers to a fire-resistant laminate which is characterized by the low calorific value thereof of ≤3 MJ/kg according to ISO 1716 comprising a plurality of mineral fleeces or glass fiber mats having different functionalities and constituents. US 2004/0258898 A1 relates to a method for fabricating fire retardant composite panels comprising: creating a water-based slurry of partially soluble boron salts; adding an adhesive to a ligneous material; and independently introducing said water-based slurry to said igneous material for fire retarding thereof.

Furthermore, paper products are available on the market comprising fibers and a particulate material. For example, WO 2009/074491 A1 relates to surface-mineralized organic fibers comprising organic fibers having a length in the millimeter range, the surface of which is at least partially coated with finely divided alkaline earth carbonate nanoparticles by means of binders, a method for producing such surface-mineralized organic fibers, aqueous slurries thereof, their use in papermaking, in surface finishing of paper, plastic, cement and clay surfaces, in paints and varnishes. US 2010/183890 A1 refers to a prepreg that can be obtained by impregnating a decorative base paper with an impregnating resin solution which contains at least one polymer latex and at least one modified starch with a specific molecular weight distribution. EP 1 036 881 A1 refers to a raw lamination paper that is composed of cellulose fibers and filling materials from a paper mass of a cellulose mixture containing an unmodified and a cationic modified cellulose. The cellulose fibers are modified with a quaternary ammonium compound with a glycidyl function. The cationic modified cellulose forms at least 5 wt % of the cellulose mixture, using a short fiber cellulose for modification. The filling material is titanium oxide, calcium carbonate, kaolin, talcum or a mixture of them. EP 0 705 939 A1 refers to a base paper for decorative coating systems being made from a paper material containing cellulose fibres, filler(s) and a cationic resin as wet strength improver, which also contains anionic inorganic particles.

Even though a great variety of fiber board products is already available on the market having tailored properties including strength, elastic properties, flame retardancy and further processability, a general disadvantage of said fiber board products is that the main constituent, i.e. the wood fibers, is based on organic renewable resources which is subject to decreasing availability at increasing prices due to an increasing demand from the biomass energy sector.

Therefore, there is a continuous need in the art for fiber board products in which at least a part of the raw material being based on organic renewable resources is replaced by an alternative material while important properties such as bending strength, internal bond strength, thickness swelling, elastic properties and further processability are maintained or improved.

DETAILED DESCRIPTION

Figure 1:
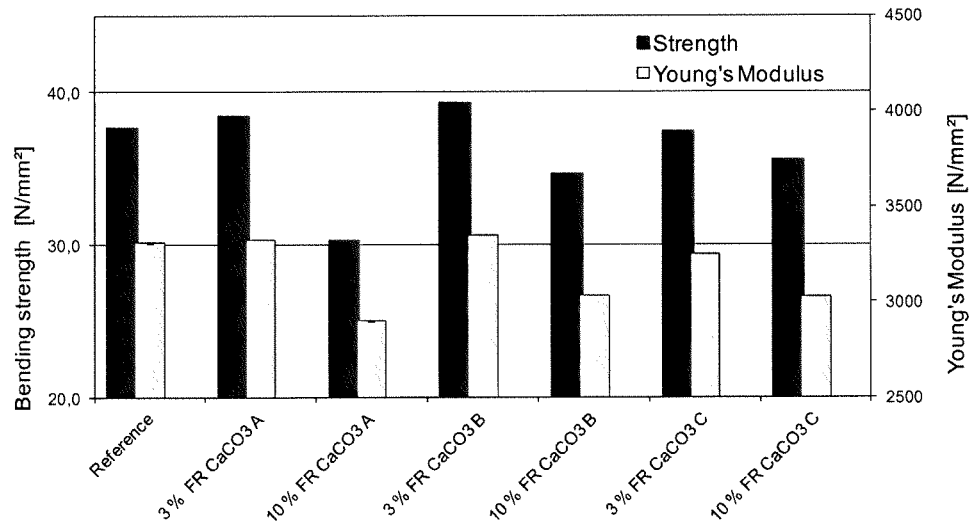
FIG. 1: Plot of binding strength and Young's Modulus for various $CaCO_3$ fiber replacement boards and reference.

Accordingly, it is an objective of the present invention to provide a fiber board product in which at least a part of the raw material being based on organic renewable resources is replaced by an alternative material. A further objective is to provide a fiber board product in which the set of other important properties such as bending strength, internal bond strength, thickness swelling, elastic properties and further processability is maintained or improved.

The foregoing and other objectives are solved by the subject-matter as defined herein in claim 1.

Advantageous embodiments of the inventive fiber board product are defined in the corresponding sub-claims.

According to one aspect of the present application a fiber board product is provided. The fiber board product comprising a) fibers in an amount from 50.0 to 99.0 parts by weight (d/d), based on the total dry weight of the fibers and the at least one particulate calcium carbonate-containing material, wherein the fibers in an amount of
  i) 0 to 20.0 wt.-%, based on the total amount of dry fibers, are of a size which is fractioned at a mesh sieve width of 0.05 mm,
  ii) 50.0 to 90.0 wt.-%, based on the total amount of dry fibers, are of a size which is fractioned at a mesh sieve width of 1.0 mm, and
  iii) 70.0 to 100.0 wt.-%, based on the total amount of dry fibers, are of a size which is fractioned at a mesh sieve width of 3.0 mm, as determined by sieve analysis, b) at least one particulate calcium carbonate-containing material in an amount from 1.0 to 50.0 parts by weight (d/d), based on the total dry weight of the fibers and the at least one particulate calcium carbonate-containing material, the at least one particulate calcium carbonate-containing material having a weight median particle size $d_{50}$ of 0.5 to 150.0 μm, and additionally c) at least one binder in an amount from 0.05 to 25.0 parts by weight (d/d), based on the total dry weight of the fibers and the at least one particulate calcium carbonate-containing material, and d) at least one wax in an amount from 0 to 5.0 parts by weight (d/d), based on the total dry weight of the fibers and the at least one particulate calcium carbonate-containing material wherein the sum of the amount of the fibers and the at least one particulate calcium carbonate-containing material is 100.0 parts by weight (d/d), based on the total dry weight of the fibers and the at least one particulate calcium carbonate-containing material.

The inventors surprisingly found out that the foregoing fiber board product according to the present invention comprises a decreased amount of raw materials based on organic renewable resources while other important properties such as bending strength, internal bond strength, thickness swelling, elastic properties and further processability are maintained or even improved. More precisely, the inventors found that up to 25.0 parts by weight of the total amount of the dry fibers in the fiber board product can be replaced by at least one particulate calcium carbonate-containing material having a weight median particle size $d_{50}$ of 0.5 to 150.0 μm.

It should be understood that for the purposes of the present invention, the following terms have the following meanings:

The term "calcium carbonate-containing material" refers to a material that comprises at least 50.0 wt.-% calcium carbonate, based on the total dry weight of the calcium carbonate-containing material.

For the purpose of the present invention, the weight median particle diameter "$d_{50}$" represents the diameter relative to which x % by weight of the particles have diameters less than $d_x$. This means that the $d_{20}$ value is the particle size at which 20.0 wt.-% of all particles are smaller, and the $d_{80}$ value is the particle size at which 80.0 wt.-% of all particles are smaller. The $d_{50}$ value is thus the weight median particle size, i.e. 50.0 wt.-% of all grains are bigger or smaller than this particle size. For the purpose of the present invention the particle size is specified as weight median particle size $d_{50}$ unless indicated otherwise. The weight median particle diameter of the at least one particulate calcium carbonate-containing material was measured by laser diffraction. In this method, the particle size is determined by measuring the intensity of light scattered as a laser beam passes through a dispersed particulate sample. The measurement is made with a Mastersizer 2000 or a Mastersizer 3000 of Malvern Instruments Ltd. (operating instrument software version 1.04). The size of the fibers was measured by fractioning through sieve analysis. The measurement was made with an air jet sieve Alpine e200 LS of HOSOKAWA ALPINE AG, Germany.

The term "binder" as used in the present invention is a compound or compound mixture that is conventionally used to bind together two or more other materials to form a composite.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to another aspect of the present invention, a process for manufacturing a fiber board product is provided. The process comprising the steps of:
  a) providing fibers in dry form or in form of an aqueous suspension,
  b) providing at least one particulate calcium carbonate-containing material,
  c) providing at least one binder and optionally at least one wax,
  d) combining the fibers of step a) simultaneously or separately in any order with the at least one particulate calcium carbonate-containing material of step b) and the at least one binder and the optional at least one wax of step c) to form a resin-impregnated fiber-calcium carbonate-containing material mixture,
  e) forming a mat from the resin-impregnated fiber-calcium carbonate-containing material mixture, and f) pressing the mat into a solid fiber board product.

According to one embodiment of the process, process step d) is carried out in that the fibers are combined simultaneously with the at least one particulate calcium carbonate-containing material of step b) and the at least one binder and the optional at least one wax of step c). According to another embodiment of the process, process step d) is carried out in that the fibers are combined separately with the at least one particulate calcium carbonate-containing material of step b) and the at least one binder and the optional at least one wax of step c), preferably the fibers are first combined with the at least one binder and the optional at least one wax of step c) and then with the at least one particulate calcium carbonate-containing material of step b). According to yet another embodiment of the process the at least one particulate calcium carbonate-containing material is provided a) in powder form, or b) in form of an aqueous slurry comprising the calcium carbonate-containing material in an amount from 1.0 to 80.0 wt.-%, preferably from 30.0 to 78.0 wt.-%, more preferably from 50.0 to 78.0 wt.-% and most preferably from 70.0 to 78.0 wt.-%, based on the total weight of the aqueous slurry. According to one embodiment of the process, process step d) is carried out in a blowline system and/or a blender. According to another embodiment of the process, combining of the fibers with the at least one particulate calcium carbonate-containing material in process step d) is carried out before or during or after the addition of the at least one binder and the optional at least one wax in the blowline system and/or blender, preferably during or after the addition of the at least one binder and the optional at least one wax in the blowline system and/or blender.

According to a further aspect of the present invention, the use of at least one particulate calcium carbonate-containing material as fiber replacement in a fiber board product, preferably in a high-density fiber (HDF) board, medium-density fiber (MDF) board, low-density fiber (LDF) board or particle board, is provided. The at least one particulate calcium carbonate-containing material has a weight median particle size $d_{50}$ of 0.5 to 150.0 µm.

According to one embodiment of the present invention, the at least one particulate calcium carbonate-containing material is dolomite and/or at least one ground calcium carbonate (GCC), preferably at least one ground calcium carbonate (GCC) selected from the group comprising marble, chalk, limestone and mixtures thereof, and/or at least one precipitated calcium carbonate (PCC), preferably at least one precipitated calcium carbonate (PCC) selected from the group comprising one or more of the aragonitic, vateritic and calcitic mineralogical crystal forms.

According to another embodiment of the present invention, the at least one particulate calcium carbonate-containing material has a) a weight median particle size $d_{50}$ from 0.7 µm to 100.0 µm, more preferably from 1.0 µm to 50.0 µm and most preferably from 2.1 µm to 40.0 µm and/or b) a specific surface area of from 0.5 to 200.0 m²/g, more preferably of from 0.5 to 100.0 m²/g and most preferably of from 0.5 to 50.0 m²/g as measured by the BET nitrogen method.

According to yet another embodiment of the present invention, the at least one particulate calcium carbonate-containing material consisting of calcium carbonate in an amount of ≥50.0 wt.-%, preferably of 90.0 wt.-%, more preferably of ≥95.0 wt.-% and most preferably of ≥97.0 wt.-%, based on the total dry weight of the calcium carbonate-containing material.

According to one embodiment of the present invention, the fibers originate from softwood tree species, hardwood tree species, non-wood fiber plants and mixtures thereof.

According to another embodiment of the present invention, the fiber board product comprises a fiber material consisting of the fibers and the at least one particulate calcium carbonate-containing material having a weight fraction of fibers in said fiber material from 99.0 to 50.0 wt.-%, preferably from 99.0 to 75.0 wt.-%, more preferably from 99.0 to 80.0 wt.-% and most preferably from 97.0 to 88.0 wt.-%, based on the total dry weight of the fibers and the at least one particulate calcium carbonate-containing material.

According to yet another embodiment of the present invention, the fiber board product comprises the fibers in an amount from 75.0 to 99.0 parts by weight (d/d) and the at least one particulate calcium carbonate-containing material in an amount from 1.0 to 25.0 parts by weight (d/d), based on the total dry weight of the fibers and the at least one particulate calcium carbonate-containing material.

According to one embodiment of the present invention, the at least one binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU) and mixtures thereof.

According to another embodiment of the present invention, the fiber board product further comprises at least one compound selected from the group comprising colorants, filler, dispersants, biocides, hardener and flame retardants.

According to yet another embodiment of the present invention, the fiber board product has a density from 35 to 1 100 kg/m³, preferably from 250 to 900 kg/m³, and most preferably from 600 to 800 kg/m³ and/or a thickness from 1.0 to 300.0 mm, preferably from 2.0 to 40.0 mm, more preferably from 4.0 to 20 mm.

As set out above, the inventive fiber board product comprises fibers, at least one particulate calcium carbonate-containing material and at least one binder as set out in points a), b) and c). In the following, it is referred to further details of the present invention and especially the foregoing points of the inventive fiber board product.

According to point a) of the present invention, the fiber board product comprises fibers in an amount from 50.0 to 99.0 parts by weight (d/d), based on the total dry weight of the fibers and the at least one particulate calcium carbonate-containing material.

It is appreciated that the fiber board product may comprise one or more kinds of fibers.

Accordingly, the fiber board product may comprise one kind of fibers. Alternatively, the fiber board product may comprise a mixture of two or more kinds of fibers. For example, the fiber board product may comprise a mixture of two or three kinds of fibers. Preferably, the fiber board product comprises one kind of fibers.

Furthermore, the fibers may be in the form of separate fibers or fiber bundles.

It is appreciated that fibers present in the fiber board product according to the present invention are not restricted to specific fibers as long as they are suitable for the preparation of fiber board products.

Preferably, the fibers are wood or non-wood fibers. The term "wood" fibers in the meaning of the present invention refers to the common definition, i.e. wood is the fibrous, hard substance making up most of the tree trunk and branches of softwood and hardwood tree species. The term "non-wood"

fibers in the meaning of the present invention refers to any fibrous material which is not derived from wood, i.e. non-wood is the fibrous substance making up most of the plants.

In one embodiment of the present invention, the fibers originate from softwood tree species, hardwood tree species, non-wood fiber plants and mixtures thereof.

It is one requirement of the instant fiber board product that said board comprises fibers having a specific size. Accordingly, it is required that the fibers in an amount of
 i) 0 to 20.0 wt.-%, based on the total amount of dry fibers, are of a size which is fractioned at a mesh sieve width of 0.05 mm,
 ii) 50.0 to 90.0 wt.-%, based on the total amount of dry fibers, are of a size which is fractioned at a mesh sieve width of 1.0 mm, and
 iii) 70.0 to 100.0 wt.-%, based on the total amount of dry fibers, are of a size which is fractioned at a mesh sieve width of 3.0 mm.

The size of the fibers is measured by fractioning through sieve analysis in an air jet sieve Alpine e200 LS of HOSOKAWA ALPINE AG, Germany.

Specific examples of fibers suitable for the fiber board product include pine, fir, spruce, western hemlock, aspen, *eucalyptus*, cypress, poplar, cedar, beech, oak, birch, maple, bamboo, cereal fibers, algae fibers, seed fibers, fruit fibers and mixtures thereof.

It is a further requirement of the instant fiber board product that it comprises the fibers in an amount from 50.0 to 99.0 parts by weight (d/d), based on the total dry weight of the fibers and the at least one particulate calcium carbonate-containing material. Preferably, the fiber board product comprises the fibers in an amount from 75.0 to 99.0 parts by weight (d/d), based on the total dry weight of the fibers and the at least one particulate calcium carbonate-containing material. More preferably, the fiber board product comprises the fibers in an amount from 80.0 to 99.0 parts by weight (d/d), based on the total dry weight of the fibers and the at least one particulate calcium carbonate-containing material. Most preferably, the fiber board product comprises the fibers in an amount from 88.0 to 97.0 parts by weight (d/d), based on the total dry weight of the fibers and the at least one particulate calcium carbonate-containing material.

Another essential component of the instant fiber board product is at least one particulate calcium carbonate-containing material. The at least one particulate calcium carbonate-containing material functions as fiber replacement and thus decreases the amount of raw materials based on organic renewable resources in a fiber board product.

The term "at least one" particulate calcium carbonate-containing material in the meaning of the present invention means that the particulate calcium carbonate-containing material comprises, preferably consists of, one or more particulate calcium carbonate-containing materials.

In one embodiment of the present invention, the at least one particulate calcium carbonate-containing material comprises, preferably consists of, one particulate calcium carbonate-containing material. Alternatively, the at least one particulate calcium carbonate-containing material comprises, preferably consists of, two or more particulate calcium carbonate-containing materials. For example, the at least one particulate calcium carbonate-containing material comprises, preferably consists of, two or three particulate calcium carbonate-containing materials.

Preferably, the at least one particulate calcium carbonate-containing material comprises, more preferably consists of, one particulate calcium carbonate-containing material.

The term at least one "particulate calcium carbonate-containing material" in the meaning of the present invention refers to a solid compound that comprises calcium carbonate.

According to one embodiment of the present invention, the at least one particulate calcium carbonate-containing material is selected from dolomite, at least one ground calcium carbonate (GCC), at least one precipitated calcium carbonate (PCC) and mixtures thereof.

"Dolomite" in the meaning of the present invention is a carbonatic calcium-magnesium-mineral having the chemical composition of $CaMg(CO_3)_2$ ("$CaCO_3.MgCO_3$"). Dolomite mineral contains at least 30.0 wt.-% $MgCO_3$, based on the total weight of dolomite, preferably more than 35.0 wt.-%, more than 40.0 wt.-%, typically from 45.0 to 46.0 wt.-% $MgCO_3$.

"Ground calcium carbonate" (GCC) in the meaning of the present invention is a calcium carbonate obtained from natural sources, such as limestone, marble or chalk, and processed through a wet and/or dry treatment such as grinding, screening and/or fractionating, for example by a cyclone or classifier.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate-containing material comprises a wet ground calcium carbonate-containing material, the grinding step may be performed under conditions such that autogenous grinding takes place and/or by horizontal ball milling, and/or other such processes known to the skilled man. The wet processed ground calcium carbonate-containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

In one embodiment of the present invention, the GCC is selected from the group comprising marble, chalk, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

It is preferred that the at least one particulate calcium carbonate-containing material comprises at least one ground calcium carbonate (GCC), preferably at least one ground calcium carbonate (GCC) selected from the group comprising marble, chalk, limestone and mixtures thereof. In one preferred embodiment, the at least one ground calcium carbonate (GCC) is marble or chalk.

In addition to calcium carbonate, the at least one particulate calcium carbonate-containing material may comprise further metal oxides such as titanium dioxide and/or aluminium trioxide, metal hydroxides such as aluminium trihydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the at least one particulate calcium carbonate-containing material is of ≥50.0 wt.-%, preferably of 90.0 wt.-%, more preferably of ≥95.0 wt.-% and most preferably of ≥97.0 wt.-%, based on the total dry weight of the calcium carbonate-containing material.

It is a specific requirement of the present invention that the at least one particulate calcium carbonate-containing material has a weight median particle size $d_{50}$ from 0.5 to 150.0 µm, as measured by Mastersizer 2000 or Mastersizer 3000.

In one embodiment of the present invention, the at least one particulate calcium carbonate-containing material has a weight median particle size $d_{50}$ from 0.7 µm to 100.0 µm, more preferably from 1.0 µm to 50.0 µm and most preferably from 2.1 µm to 40.0 µm, as measured by Mastersizer 2000 or a Mastersizer 3000.

In one embodiment of the present invention, the at least one particulate calcium carbonate-containing material has a weight median particle size $d_{50}$ from 2.1 µm to 150.0 µm, preferably from 2.1 to 100.0 µm, more preferably from 2.1 to 50.0 µm and most preferably from 2.1 µm to 40.0 µm as measured by Mastersizer 2000 or a Mastersizer 3000.

The at least one particulate calcium carbonate-containing material may have a top cut, for example, of below 150.0 µm. The term "top cut" (or top size), as used herein, means the particle size value wherein at least 98.0 wt.-% of the material particles are less than that size. Preferably, the at least one particulate calcium carbonate-containing material has a top cut of below 140.0 µm and more preferably of below 120.0 µm.

Additionally or alternatively, the at least one particulate calcium carbonate-containing material has a specific surface area of from 0.5 to 200.0 m²/g, more preferably of from 0.5 to 100.0 m²/g and most preferably of from 0.5 to 50.0 m²/g as measured by the BET nitrogen method.

The term "specific surface area" (in m²/g) of the at least one particulate calcium carbonate-containing material in the meaning of the present invention is determined using the BET method, which is well known to the skilled man (ISO 9277:1995).

It is appreciated that the fiber board product comprises the at least one particulate calcium carbonate-containing material in an amount from 1.0 to 50.0 parts by weight (d/d), based on the total dry weight of the fibers and the at least one particulate calcium carbonate-containing material.

The term "dry" with regard to the at least one particulate calcium carbonate-containing material is understood to be a material having less than 0.3% by weight of water relative to the weight of the at least one particulate calcium carbonate-containing material. The % water is determined according to the Coulometric Karl Fischer measurement method, wherein the at least one particulate calcium carbonate-containing material is heated to 220° C., and the water content released as vapour and isolated using a stream of nitrogen gas (at 100 ml/min) is determined in a Coulometric Karl Fischer unit.

The term "dry" with regard to the fibers is understood to be absolutely dry fibers having 0% by weight of water relative to the weight of the fibers. The "absolutely dry fibers" are determined by treating the fibers at 103° C. to constant weight in accordance with DIN 52 183.

Preferably, the fiber board product comprises the at least one particulate calcium carbonate-containing material in an amount from 1.0 to 25.0 parts by weight (d/d), based on the total dry weight of the fibers and the at least one particulate calcium carbonate-containing material. More preferably, the fiber board product comprises the at least one particulate calcium carbonate-containing material in an amount from 1.0 to 20.0 parts by weight (d/d), based on the total dry weight of the fibers and the at least one particulate calcium carbonate-containing material. Most preferably, the fiber board product comprises the at least one particulate calcium carbonate-containing material in an amount of from 3.0 to 12.0 parts by weight (d/d), based on the total dry weight of the fibers and the at least one particulate calcium carbonate-containing material.

It is one requirement of the present fiber board product that the sum of the amount of fibers and the at least one particulate calcium carbonate-containing material is 100.0 parts by weight (d/d), based on the total dry weight of the fibers and the at least one particulate calcium carbonate-containing material.

Thus, the fiber board product comprises the fibers in an amount from 50.0 to 99.0 parts by weight (d/d) and the at least one particulate calcium carbonate-containing material in an amount from 1.0 to 50.0 parts by weight (d/d) based on the total dry weight of the fibers and the at least one particulate calcium carbonate-containing material. Preferably, the fiber board product comprises the fibers in an amount from 75.0 to 99.0 parts by weight (d/d) and the at least one particulate calcium carbonate-containing material in an amount from 1.0 to 25.0 parts by weight (d/d), based on the total dry weight of the fibers and the at least one particulate calcium carbonate-containing material. More preferably, the fiber board product comprises the fibers in an amount from 80.0 to 99.0 parts by weight (d/d) and the at least one particulate calcium carbonate-containing material in an amount from 1.0 to 20.0 parts by weight (d/d), based on the total dry weight of the fibers and the at least one particulate calcium carbonate-containing material. Most preferably, the fiber board product comprises the fibers in an amount from 88.0 to 97.0 parts by weight (d/d) and the at least one particulate calcium carbonate-containing material in an amount from 3.0 to 12.0 parts by weight (d/d), based on the total dry weight of the fibers and the at least one particulate calcium carbonate-containing material.

It is appreciated that the fiber board product preferably comprises the at least one particulate calcium carbonate-containing material in a high amount if the at least one particulate calcium carbonate-containing material has a high weight median particle size $d_{50}$ value. That is to say, the amount of fiber which can be replaced by the at least one particulate calcium carbonate-containing material in the fiber board product is higher if the at least one particulate calcium carbonate-containing material has a weight median particle size $d_{50}$ from 2.1 µm to 150.0 µm, preferably from 2.1 to 100.0 µm, more preferably from 2.1 to 50.0 µm and most preferably from 2.1 µm to 40.0 µm as measured by Mastersizer 2000 or a Mastersizer 3000 compared to a fiber board product comprising at least one particulate calcium carbonate-containing material having a weight median particle size $d_{50}$ from 0.5 μm to 2.1 μm, as measured by Mastersizer 2000 or a Mastersizer 3000.

Preferably, the fiber board product comprises the at least one particulate calcium carbonate-containing material in an amount from 3.0 to 12.0 parts by weight (d/d), based on the total dry weight of the fibers and the at least one particulate calcium carbonate-containing material, if the at least one particulate calcium carbonate-containing material has a weight median particle size $d_{50}$ from 2.1 μm to 150.0 μm, preferably from 2.1 to 100.0 μm, more preferably from 2.1 to 50.0 μm and most preferably from 2.1 μm to 40.0 μm as measured by Mastersizer 2000 or a Mastersizer 3000.

It is thus appreciated that the fiber board product comprises a fiber material consisting of the fibers and the at least one particulate calcium carbonate-containing material, i.e. a part of the fibers is replaced with the at least one particulate calcium carbonate-containing material.

Thus, the fiber material consisting of the fibers and the at least one particulate calcium carbonate-containing material comprises a weight fraction of fibers from 99.0 to 50.0 wt.-%, based on the total dry weight of the fibers and the at least one particulate calcium carbonate-containing material. Preferably, the fiber material consisting of the fibers and the at least one particulate calcium carbonate-containing material comprises a weight fraction of fibers from 99.0 to 75.0 wt.-%, more preferably from 99.0 to 80.0 wt.-% and most preferably from 97.0 to 88.0 wt.-%, based on the total dry weight of the fibers and the at least one particulate calcium carbonate-containing material.

Another essential component of the present fiber board product is at least one binder.

It is appreciate that the fiber board product comprises the at least one binder in an amount from 0.05 to 25.0 parts by weight (d/d), based on the total dry weight of the fibers and the at least one particulate calcium carbonate-containing material. Preferably, the fiber board product comprises the at least one binder in an amount from 0.5 to 15.0 parts by weight (d/d) and most preferably from 1.0 to 15.0 parts by weight (d/d), based on the total dry weight of the fibers and the at least one particulate calcium carbonate-containing material.

In one embodiment of the present invention, the fiber board product comprises, preferably consists of, the fibers in an amount from 50.0 to 99.0 parts by weight (d/d), based on the total dry weight of the fibers and the at least one particulate calcium carbonate-containing material, the at least one particulate calcium carbonate-containing material in an amount from 1.0 to 50.0 parts by weight (d/d), based on the total dry weight of the fibers and the at least one particulate calcium carbonate-containing material, and additionally the at least one binder in an amount from 0.05 to 25.0 parts by weight (d/d), based on the total dry weight of the fibers and the at least one particulate calcium carbonate-containing material, wherein the sum of the amount of the fibers and the at least one particulate calcium carbonate-containing material is 100.0 parts by weight (d/d), based on the total dry weight of the fibers and the at least one particulate calcium carbonate-containing material.

The term "at least one" binder in the meaning of the present invention means that the binder comprises, preferably consists of, one or more binders.

In one embodiment of the present invention, the at least one binder comprises, preferably consists of, one binder. Alternatively, the at least one binder comprises, preferably consists of, two or more binders. For example, the at least one binder comprises, preferably consists of, two or three binders.

Preferably, the at least one binder comprises, more preferably consists of, one binder.

It is appreciated that the at least one binder present in the fiber board product according to the present invention is not restricted to a specific binder as long as it is suitable for joining together the fibers and the at least one particulate calcium carbonate-containing material, i.e. for the preparation of fiber board products.

In one embodiment of the present invention, the at least one binder is a binder which curing reaction takes place under high temperature, e.g. ranging from 150 to 250° C., more preferably from 180 to 220° C., and/or in the presence of a hardener such as ammonium chloride, ammonium sulfate or magnesium chloride. Preferably, the at least one binder is a binder which curing reaction takes place under high temperature, e.g. ranging from 150 to 250° C., more preferably from 180 to 220° C., and in the presence of a hardener.

It is appreciated that the hardener is not restricted to a specific hardener as long as it is suitable for curing the at least one binder for the preparation of fiber board products. Thus, the hardener can be selected from hardener typically used in the preparation of fiber board products and are well known to a person skilled in the art. For example, the hardener is selected from the group comprising ammonium chloride, ammonium sulfate and magnesium chloride.

For example, the at least one binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), polyamide-epichlorhydrin resins, latex-based binders, lignin-based binders, starch-based binder, tannin-based binders, soya-based binder, carboxymethylcellulose-based binders and mixtures thereof.

Preferably, the at least one binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU) and mixtures thereof More preferably, the at least one binder is selected from the group comprising phenol-formaldehyde resin (PF), urea-formaldehyde resin (UF), melamine-urea-formaldehyde resin (MUF), polyurethane resin (PU) and mixtures thereof. Most preferably, the at least one binder is selected from urea-formaldehyde resin (UF) and/or melamine-urea-formaldehyde resin (UMF).

The fiber board product of the present invention optionally further comprises at least one wax. Thus, the fiber board product comprises the at least one wax in an amount from 0 to 5.0 parts by weight (d/d), based on the total dry weight of the fibers and the at least one particulate calcium carbonate-containing material. Preferably, the fiber board product comprises the at least one wax in an amount from 0 to 4.0 parts by weight (d/d), based on the total dry weight of the fibers and the at least one particulate calcium carbonate-containing material. More preferably, the fiber board product comprises the at least one wax in an amount from 0 to 3.0 parts by weight (d/d), based on the total dry weight of the fibers and the at least one particulate calcium carbonate-containing material.

If the fiber board product comprises at least one wax, the fiber board product comprises the at least one wax in an amount from 0.01 to 5.0 parts by weight (d/d), based on the total dry weight of the fibers and the at least one particulate calcium carbonate-containing material. Preferably, the fiber board product comprises the at least one wax in an amount from 0.05 to 4.0 parts by weight (d/d), based on the total dry weight of the fibers and the at least one particulate calcium carbonate-containing material. More preferably, the fiber board product comprises the at least one wax in an amount from 0.05 to 3.0 parts by weight (d/d), based on the total dry weight of the fibers and the at least one particulate calcium carbonate-containing material.

Thus, the fiber board product comprises, preferably consists of, the fibers in an amount from 50.0 to 99.0 parts by weight (d/d), based on the total dry weight of the fibers and the at least one particulate calcium carbonate-containing material, the at least one particulate calcium carbonate-containing material in an amount from 1.0 to 50.0 parts by weight (d/d), based on the total dry weight of the fibers and the at least one particulate calcium carbonate-containing material, and additionally the at least one binder in an amount from 0.05 to 25.0 parts by weight (d/d), based on the total dry weight of the fibers and the at least one particulate calcium carbonate-containing material and optionally the at least one wax in an amount from 0 to 5.0 parts by weight (d/d), based on the total dry weight of the fibers and the at least one particulate calcium carbonate-containing material, wherein the sum of the amount of the fibers and the at least one particulate calcium carbonate-containing material is 100.0 parts by weight (d/d), based on the total dry weight of the fibers and the at least one particulate calcium carbonate-containing material.

If the fiber board product comprises the at least one wax, the fiber board product preferably comprises, more preferably consists of, the fibers in an amount from 50.0 to 99.0 parts by weight (d/d), based on the total dry weight of the fibers and the at least one particulate calcium carbonate-containing material, the at least one particulate calcium carbonate-containing material in an amount from 1.0 to 50.0 parts by weight (d/d), based on the total dry weight of the fibers and the at least one particulate calcium carbonate-containing material, and additionally the at least one binder in an amount from 0.05 to 25.0 parts by weight (d/d), based on the total dry weight of the fibers and the at least one particulate calcium carbonate-containing material and the at least one wax in an amount from 0.01 to 5.0 parts by weight (d/d), based on the total dry weight of the fibers and the at least one particulate calcium carbonate-containing material, wherein the sum of the amount of the fibers and the at least one particulate calcium carbonate-containing material is 100.0 parts by weight (d/d), based on the total dry weight of the fibers and the at least one particulate calcium carbonate-containing material.

It is appreciated that the at least one wax is not restricted to a specific wax as long as it is suitable for use in fiber board products. Thus, the at least one wax can be selected from waxes typically used in the field of fiber board products and are well known to a person skilled in the art. For example, the at least one wax is selected from paraffin wax, wax-emulsion and wax dispersion, including polyethylene wax emulsion such as Poligen®, from BASF, Germany or Hydrowax® from SASOL GmbH, Germany.

The fiber board product of the present invention may comprise one or more further optional additive. They will preferably be selected from additives typically used in the preparation of fiber board products and are well known to a person skilled in the art. They may comprise at least one compound selected from the group comprising colorants, filler, dispersants, biocides, hardener such as ammonium chloride, ammonium sulfate or magnesium chloride and flame retardants.

The amount of each of these additives to be optionally included can be determined in accordance with standard practice and with the desired properties of the final fiber board product in mind. Advantageously, the fiber board product of the present invention will preferably include less than 10.0 parts by weight (d/d), more preferably less than 5.0 parts by weight (d/d) and most preferably less than 2.0 parts by weight (d/d), such as from 0.1 to 1.0 parts by weight (d/d), based on the total dry weight of the fibers and the at least one particulate calcium carbonate-containing material, of said additives.

The fiber board product of the present invention can have a density from 35 to 1 100 kg/m$^3$. Preferably, the fiber board product of the present invention has a density from 250 to 900 kg/m$^3$ and most preferably from 600 to 800 kg/m$^3$.

Additionally or alternatively, the fiber board product of the present invention has a thickness from 0.2 to 300.0 mm, preferably from 2.0 to 40.0 mm and most preferably from 4.0 to 20 mm.

In one embodiment of the present invention, the fiber board product has a density from 35 to 1 100 kg/m$^3$, preferably from 250 to 900 kg/m$^3$ and most preferably from 600 to 800 kg/m$^3$ and a thickness from 1.0 to 300.0 mm, preferably from 2.0 to 40.0 mm and most preferably from 4.0 to 20 mm. For example, the fiber board product has a density from 35 to 1 100 kg/m$^3$ and a thickness from 1.0 to 300.0 mm, preferably from 2.0 to 40.0 mm and most preferably from 4.0 to 20 mm. Alternatively, the fiber board product has a density from 250 to 900 kg/m$^3$ and a thickness from 1.0 to 300.0 mm, preferably from 2.0 to 40.0 mm and most preferably from 4.0 to 20 mm. Alternatively, the fiber board product has a density from 600 to 800 kg/m$^3$ and a thickness from 1.0 to 300.0 mm, preferably from 2.0 to 40.0 mm and most preferably from 4.0 to 20 mm.

Thus, the fiber board product of the present invention may be selected from high-density fiber (HDF) board, medium-density fiber (MDF) board, low-density fiber (LDF) board and particle board. Preferably, the fiber board product of the present invention is a medium-density fiber (MDF) board.

According to another aspect of the present invention, a process for manufacturing a fiber board product as defined above is provided. The process comprising the steps of:
  a) providing fibers in dry form or in form of an aqueous suspension,
  b) providing at least one particulate calcium carbonate-containing material,
  c) providing at least one binder and optionally at least one wax,
  d) combining the fibers of step a) simultaneously or separately in any order with the at least one particulate calcium carbonate-containing material of step b) and the at least one binder and the optional at least one wax of step c) to form a resin-impregnated fiber-calcium carbonate-containing material mixture,
  e) forming a mat from the resin-impregnated fiber-calcium carbonate-containing material mixture, and
  f) pressing the mat into a solid fiber board product.

With regard to the definition of the fibers, at least one particulate calcium carbonate-containing material, at least one binder and/or at least one wax and preferred embodiments thereof, reference is made to the statements provided above when discussing the technical details of the fiber board product of the present invention.

The manufacturing of fiber board products may be undertaken by all the techniques and process lines well known to the man skilled in the art for manufacturing fiber board products such as a continuous or discontinuous process. The fiber board products are preferably manufactured in a continuous process.

Additionally or alternatively, the manufacturing of fiber board products may be undertaken in a dry process or wet process which are well known to the man skilled in the art. The fiber board products are preferably manufactured in a dry process.

The fibers to be provided in the instant process are preferably obtained from wood chips and/or plant chips, which, may be steamed or otherwise moisturized. A preferred means of moisturizing the chips is to place them in a steam-pressurized digester whereby the chips are exposed to pre-heated steam, preferably having a temperature of 80 to 150° C., with a high moisture content. The chips are preferably steamed to a moisture content of up to about 20.0 wt.-%, based on the total weight of the fibers.

In addition thereto, said chips are broken down further into fibers that are suitable for being formed into mats. A preferred means of doing so is through the use of a pressurized refiner.

For example, the fibers are refined to a length in the range from 0.1 to 100.0 mm, preferably in the range from 0.5 to 50.0 mm and most preferably in the range from 0.7 to 10.0 mm. It is to be noted that the length of the fibers relates to the longest dimension of the fibers.

The fibers may then be subjected to an optional predrying such as to reduce the moisture content to about 10.0 wt.-% or less, based on the total weight of the fibers. It is appreciated that higher moisture contents are not preferred as it will result in a weaker final fiber board product and/or blows in the product.

The optional predrying of the fibers to reduce the moisture content of the fibers to the desired level is preferably carried out in a tube dryer. Tube dryer such as single-stage or multiple-stage tube dryer are well known in the art and are widely used for drying fibers in the manufacturing of fiber board products.

The fibers can be dried for a time period and/or at a temperature sufficient to reduce the moisture content of the fibers to the desired level. The fibers are preferably dried to a moisture content of about 10.0 wt.-% or less, based on the total weight of the fibers. The drying time and/or temperature may be adjusted according to the temperature and the moisture content of the fibers.

Thus, it is appreciated that the fibers can be provided in dry form. The fibers are preferably provided in dry form if the fiber board product is manufactured in a dry process.

Alternatively, if the fiber board product is manufactured in a wet process, the fibers are preferably provided in the form of an aqueous suspension.

The aqueous suspension of fibers may be formed by suspending the fibers provided in dry form, i.e. as obtained after the predryer, in water or by diluting the fibers obtained after the refiner to the desired fiber content.

The fibers leave the refiner or predryer preferably in the blowline system and/or a blender. In the blowline system and/or blender, the fibers are combined with the at least one particulate calcium carbonate-containing material and the at least one binder and the optional at least one wax.

The fibers are combined with the at least one particulate calcium carbonate-containing material and the at least one binder and the optional at least one wax to form a resin-impregnated fiber material in any order. Thus, the at least one particulate calcium carbonate-containing material and the at least one binder and the optional at least one wax may be added simultaneously or separately in any order to the fibers, in a manner known by the skilled person.

In one embodiment of the present invention, the at least one particulate calcium carbonate-containing material is provided in powder form or in form of an aqueous slurry.

For example, the at least one particulate calcium carbonate-containing material is provided in powder form.

If the at least one particulate calcium carbonate-containing material is provided in form of an aqueous slurry, the aqueous slurry preferably comprises the at least one particulate calcium carbonate-containing material in an amount from 1.0 to 80.0 wt.-%, based on the total weight of the aqueous slurry. More preferably, the aqueous slurry comprises the at least one particulate calcium carbonate-containing material in an amount from 30.0 to 78.0 wt.-%, more preferably from 50.0 to 78.0 wt.-% and most preferably from 70.0 to 78.0 wt.-%, based on the total weight of the aqueous slurry.

An aqueous "slurry" or "suspension" in the meaning of the present invention comprises insoluble solids and water and optionally further additives such as dispersants, biocides and/or thickener and usually may contain large amounts of solids and, thus, can be more viscous and generally of higher density than the liquid from which it is formed.

The term "aqueous" slurry or suspension refers to a system, wherein the liquid phase comprises, preferably consists of, water. However, said term does not exclude that the liquid phase of the aqueous slurry or suspension comprises minor amounts of at least one water-miscible organic solvent selected from the group comprising methanol, ethanol, acetone, acetonitrile, tetrahydrofuran and mixtures thereof. If the aqueous slurry or suspension comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous slurry or suspension. For example, the liquid phase of the aqueous slurry or suspension consists of water. If the liquid phase of the aqueous slurry or suspension consists of water, the water to be used can be any water available such as tap water and/or deionised water.

The aqueous slurry of the at least one particulate calcium carbonate-containing material may be formed by suspending the at least one particulate calcium carbonate-containing material provided in powder form in water.

In one embodiment of the present invention, said aqueous slurry has a pH of between 7 and 10, more preferably a pH from 7 to 9 and most preferably a pH from 8 to 9.

Preferably, the at least one particulate calcium carbonate-containing material is provided in the form of an aqueous slurry.

It is appreciated that the at least one binder provided in process step c) is preferably at least one binder which curing reaction takes place under high temperature, e.g. ranging from 150 to 250° C., more preferably from 180 to 220° C., and/or in the presence of a hardener such as ammonium chloride, ammonium sulfate or magnesium chloride. More preferably, the at least one binder provided in process step c) is at least one binder which curing reaction takes place under high temperature, e.g. ranging from 150 to 250° C., more preferably from 180 to 220° C., and in the presence of a hardener such as ammonium chloride, ammonium sulfate or magnesium chloride.

In one embodiment of the present invention, process step d) is carried out in that the fibers are combined simultaneously with the at least one particulate calcium carbonate-containing material and the at least one binder and the optional at least one wax. For example, process step d) is carried out in that the fibers are combined with a blend consisting of the at least one particulate calcium carbonate-containing material and the at least one binder and the optional at least one wax. That is to say, said at least one particulate calcium carbonate-containing material and said at least one binder and the optional at least one wax may be pre-mixed prior to addition to said fibers.

Preferably, the addition of the at least one particulate calcium carbonate-containing material in the form of an aqueous slurry can be carried out in process step d) in that the at least one binder and the optional at least one wax and the aqueous slurry of the at least one particulate calcium carbonate-containing material are added independently from each other to the fibers.

In an alternative embodiment, said at least one particulate calcium carbonate-containing material and the at least one binder and the optional at least one wax are added separately to the fibers. For example, the at least one particulate calcium carbonate-containing material can be added to the fibers prior the at least one binder and the optional at least one wax. Alternatively, the at least one particulate calcium carbonate-containing material can be added to the fibers after the at least one binder and the optional at least one wax. It is to be noted that the at least one binder and, if present, the at least one wax are preferably added simultaneously to the fibers. For example, the at least one binder and, if present, the at least one wax are preferably added as a blend consisting of the at least one binder and the at least one wax. That is to say, said at least one binder and, if present, the at least one wax may be pre-mixed prior to addition to said fibers.

Preferably, the fibers are first combined with the at least one binder and the optional at least one wax and then with the at least one particulate calcium carbonate-containing material.

As already mentioned above, the step of combining the components provided in step a), step b) and step c), preferably takes place in a blowline system and/or a blender.

In one embodiment, process step d) is carried out in a blender. If the fibers are combined with the at least one particulate calcium carbonate-containing material and the at least one binder and the optional at least one wax in a blender, the fibers are preferably predried and separated from the gas stream by a fiber recovery cyclone, then conveyed to the blender. In this embodiment, the at least one binder and the optional at least one wax and the at least one particulate calcium carbonate-containing material are applied to the fibers preferably by means of spray nozzles, tubes, or atomizers.

Additionally or alternatively, process step d) is carried out in a blowline system. If a blowline system is used for combining the fibers with the at least one particulate calcium carbonate-containing material and the at least one binder and the optional at least one wax, the at least one binder and the optional at least one wax and the at least one particulate calcium carbonate-containing material are applied to the fibers while the obtained resin-impregnated fiber-calcium carbonate-containing material mixture leaves the blowline system.

Preferably, process step d) is carried out in a blowline system.

As already indicated above, the fibers can be combined simultaneously or separately in any order with the at least one particulate calcium carbonate-containing material of step b) and the at least one binder and the optional at least one wax of step c) to form a resin-impregnated fiber-calcium carbonate-containing material mixture.

It is appreciated that the term "resin-impregnated" fiber-calcium carbonate-containing material mixture refers to a mixture of the fibers and of the calcium carbonate-containing material being at least partially resinated, i.e. the outer surface of the fibers and of the calcium carbonate-containing material is at least partially covered, preferably substantially completely covered, by the at least one binder and the optional at least one wax.

That is to say, combining of the fibers with the at least one particulate calcium carbonate-containing material in process step d) is carried out before or during or after the addition of the at least one binder and the optional at least one wax in the blowline system and/or blender.

Preferably, combining of the fibers with the at least one particulate calcium carbonate-containing material in process step d) is carried out during or after the addition of the at least one binder and the optional at least one wax in the blowline system and/or blender. More preferably, combining of the fibers with the at least one particulate calcium carbonate-containing material in process step d) is carried out after the addition of the at least one binder and the optional at least one wax in the blowline system and/or blender.

In one embodiment of the present invention, combining of the fibers with the at least one particulate calcium carbonate-containing material in process step d) is carried out before or during or after the addition of the at least one binder and the optional at least one wax in the blowline system or blender, preferably blowline system.

Preferably, combining of the fibers with the at least one particulate calcium carbonate-containing material in process step d) is carried out during or after the addition of the at least one binder and the optional at least one wax in the blowline system or blender, preferably blowline system. More preferably, combining of the fibers with the at least one particulate calcium carbonate-containing material in process step d) is carried out after the addition of the at least one binder and the optional at least one wax in the blowline system or blender, preferably blowline system.

It is appreciated that the at least one particulate calcium carbonate-containing material is provided in powder form or in the form of an aqueous slurry, as described above, if combining step d) is carried out in a blowline system. For example, the at least one particulate calcium carbonate-containing material is provided in the form of an aqueous slurry, as described above, if combining step d) is carried out in a blowline system in that the at least one particulate calcium carbonate-containing material is added before or after the addition of the at least one binder and the optional at least one wax. Alternatively, the at least one particulate calcium carbonate-containing material is preferably provided in powder form, as described above, if combining step d) is carried out in a blowline system in that the at least one particulate calcium carbonate-containing material is added during the addition of the at least one binder and the optional at least one wax.

If combining step d) is carried out in a blender, the at least one particulate calcium carbonate-containing material is preferably provided in powder form.

If the fiber board product comprises at least one wax, the at least one wax is applied to the fibers separately from the at least one particulate calcium carbonate-containing material and the at least one binder. However, it is preferred to apply the at least one wax, if present, together with the at least one binder for purposes of uniformity.

The further additives, preferably the at least one compound selected from the group comprising colorants, filler, dispersants, biocides, hardener such as ammonium chloride, ammonium sulfate or magnesium chloride and flame retardants, can be applied to the fibers separately from the at least one particulate calcium carbonate-containing material and the at least one binder, but it is preferred to apply said further additives together with the at least one binder for purposes of uniformity.

The fibers are combined with the at least one particulate calcium carbonate-containing material and the at least one binder and the optional at least one wax in the blowline system and/or blender such as to form a resin-impregnated fiber-calcium carbonate-containing material mixture.

The resin-impregnated fiber-calcium carbonate-containing material mixture obtained in the blowline system and/or blender then preferably runs through an optional dryer where it may be dried.

The resin-impregnated fiber-calcium carbonate-containing material mixture obtained in the blowline system and/or blender or the optional dryer then runs over a belt conveyer that feeds the resin-impregnated fiber-calcium carbonate-containing material mixture to a forming machine such as to form a mat from the resin-impregnated fiber-calcium carbonate-containing material mixture.

The forming step e) may be undertaken by all the techniques and methods well known to the man skilled in the art for forming a mat from the resin-impregnated fiber-calcium carbonate-containing material mixture. The forming step e) may be carried out with any conventional forming machine, for example, under conditions such that a continuous mat of the resin-impregnated fiber-calcium carbonate-containing material mixture is obtained or other such equipment known to the skilled person.

If the fiber board product is manufactured in a wet process, the resin-impregnated fiber-calcium carbonate-containing material mixture is preferably subjected to a step of reducing the water content of the resin-impregnated fiber-calcium carbonate-containing material mixture. Such drying can be carried out before or during or after, preferably during, process step e). Such drying may be undertaken by all the techniques and methods well known to the man skilled in the art for reducing the water content of a resin-impregnated fiber-calcium carbonate-containing material mixture. The drying may be carried out with any conventional method, e.g. by vacuum, force of gravity or suction power such that a resin-impregnated fiber-calcium carbonate-containing material mixture having a water content that is reduced compared to the water content before the drying is obtained or other such equipment known to the skilled person.

The mat formed from the resin-impregnated fiber-calcium carbonate-containing material mixture is then pressed into a solid fiber board product in process step f).

In one embodiment of the present invention, the mat formed from the resin-impregnated fiber-calcium carbonate-containing material mixture in process step e) can be pre-pressed before the obtained mat is subjected to pressing step f).

If the resin-impregnated fiber-calcium carbonate-containing material mixture is prepressed, the prepressing may be carried out by all the techniques and methods well known to the man skilled in the art for prepressing the resin-impregnated fiber-calcium carbonate-containing material mixture into a prepressed mat. The prepressing may be carried out with any conventional pressing machine, e.g. single-opening presses, multi-opening batch presses or continuous presses, under conditions such that a prepressed mat is obtained or other such equipment known to the skilled person.

The pressing step f) may be undertaken by all the techniques and methods well known to the man skilled in the art for pressing a mat of resin-impregnated fiber-calcium carbonate-containing material mixture into a solid fiber board product. The pressing step f) may be carried out with any conventional pressing machine, e.g. single-opening presses, multi-opening batch presses or continuous presses, under conditions such that a solid fiber board product is obtained or other such equipment known to the skilled person. Preferably, pressing step f) is carried out with a continuous press.

For example, heat and/or pressure, preferably heat and pressure, are applied to the mat to activate the at least one binder and hardener such as ammonium chloride, ammonium sulfate or magnesium chloride which is typically present in the at least one binder, such as to join together the fibers and the at least one particulate calcium carbonate-containing material into a solid fiber board product in pressing step f).

It is appreciated that the pressing temperature, pressure, and time will vary according to the solid fiber board product to be produced. However, pressing step f) is preferably carried out at a temperature ranging from 150 to 250° C., more preferably from 180 to 220° C. to ensure a complete curing reaction of the at least one binder.

The final solid fiber board product is preferably pressed to a density from 35 to 1 100 kg/m$^3$, preferably from 250 to 900 kg/m$^3$, and most preferably from 600 to 800 kg/m$^3$. Additionally or alternatively, the final solid fiber board product is pressed to a thickness from 1.0 to 300.0 mm, preferably from 2.0 to 40.0 mm, more preferably from 4.0 to 20.0 mm.

After pressing step f), the final solid fiber board product can be cooled prior to stacking. The final solid fiber board product may then be optionally sanded and/or trimmed to the final desired dimensions, any other finishing operations (such as laminate or coating or direct printing application) may be further done.

In view of the very good results of the at least one particulate calcium carbonate-containing material as fiber replacement in the fiber board product as defined above, a further aspect of the present invention refers to the use of at least one particulate calcium carbonate-containing material having a weight median particle size $d_{50}$ of 0.5 to 150.0 μm as fiber replacement in a fiber board product, preferably in a high-density fiber (HDF) board, medium-density fiber (MDF) board, low-density fiber (LDF) board or particle board.

With regard to the definition of the fiber board product and the at least one particulate calcium carbonate-containing material and preferred embodiments thereof, reference is made to the statements provided above when discussing the technical details of the fiber board product of the present invention.

The following examples may additionally illustrate the invention but are not meant to restrict the invention to the exemplified embodiments. The examples below show the fiber replacement by the at least one particulate calcium carbonate-containing material and the good mechanical properties of the fiber board product according to the present invention:

EXAMPLES

Measurement Methods

The following measurement methods are used to evaluate the parameters given in the examples and claims.

Particle Size Distribution (Mass % Particles with a Diameter <X) and Weight Median Diameter ($d_{50}$) of a Particulate Calcium Carbonate-Containing Material Weight median grain diameter and grain diameter mass distribution of a particulate calcium carbonate-containing material were determined via laser diffraction, i.e. the particle size is determined by measuring the intensity of light scattered as a laser beam passes through a dispersed particulate sample. The measurement was made with a Mastersizer 2000 or a Mastersizer 3000 of Malvern Instruments Ltd. (operating instrument software version 1.04). Alternatively, the measurement can be made with a HELOS particle-size-analyzer of Sympatec, Germany.

The method and the instruments are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Size of Fibers

The size of the fibers was determined via fractioning by using sieve analysis. The measurement was made with an air jet sieve Alpine e200 LS of HOSOKAWA ALPINE AG, Germany.

The measurement was carried out by applying an air flow to the fibers being placed in a sieve by a rotating slit nozzle located underneath the sieve. The fibers are thus subjected to a fractioning by air dispersing and simultaneous suction of the fibers through the sieve over a time period of 5 min. The balance between the amount of fiber before being placed in the sieve and after fractioning was considered as the through fraction in gram. Depending on the number of the chosen sieve mesh widths, the fractioning is repeated starting with the smallest sieve mesh widths to the largest sieve mesh width. Thus, for each sieve mesh width the percentage of the total amount of the fibers which is fractionized can be calculated. The mesh widths of the sieves were chosen among the following mesh widths (in mm): 0.05-0.063-0.08-0.1-0.125-0.2-0.315-0.4-0.5-0.63-0.8-1.0-1.6-2.0-3.0-3.15-4.0-5.0. For each analysis, at least three sieve mesh widths were chosen such that the size of the fibers was sufficiently covered by the chosen mesh widths. Unless otherwise indicated the size of the fibers is measured at a sieve mesh width of 0.05 mm, 1.0 mm and 3.0 mm.

BET Specific Surface Area of a Material

Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

pH of an Aqueous Slurry

The pH of the aqueous slurry was measured using a standard pH-meter at room temperature, approximately 22° C.

Density

Density measurements were made in accordance with DIN EN 323.

Thickness Swelling

Thickness swelling measurements were made after 24 h water exposure in accordance with DIN EN 317.

Internal Bond Strength

Internal bond strength measurements were made in accordance with DIN EN 319.

Bending Strength and Young's Modulus

Bending strength and Young's modulus were measured in accordance with DIN EN 310.

Solids Content

The solids content was measured using a Moisture Analyzer of Mettler-Toledo HP43. The method and the instrument are known to the skilled person.

d/d

The term "d/d" (dry/dry) refers to the dry amount based on the dry amount of the defined solid material.

Calcium Carbonate Content

For the measurement of the calcium carbonate content in a fiber board product, clean crucibles were placed in a preheated muffle furnace at 560° C. for approximately 1 hour. The crucibles were allowed to cool down in a desiccators for about 20 to 30 min and then weighed accurate to 0.0001 grams. Subsequently, the fiber board product was crushed down and accurately weighed into a crucible. The organic material was slowly burned off in that the crucible with the fiber board product was placed in the cooled muffle furnace (approximately 23-100° C.) and then the temperature was set to 560° C., while the opening on the top of the furnace was kept about three quarters closed to ensure a slow ashing. After approximately 1 hour, the opening on the top of the furnace was completely opened allowing more air in for faster ashing. The samples were left in the furnace until the ash in the crucibles turned white, indicating removal of all carbon from charring. After cooling in a desiccator, the crucible was weighed with the obtained residue. The values given herein are the average of two measurements of independently prepared samples.

About 10.000 grams of the obtained residue were weighed in a flask/beaker and a small amount of demineralized water was added. If the calcium carbonate content of a particulate calcium carbonate-containing material was to be determined, 10.000 grams of the dry sample (dried at 110° C. for 5 hours in an oven) were weighed in a flask/beaker and a small amount of demineralized water was added. Then, 40 mL of hydrochloric acid (25% p.a.) were added to the respective sample and after the $CO_2$ development stopped, the mixture was boiled for about 5 min. After cooling down, the mixture was filtered through a 0.8 µm cellulose-acetate filter and washed thoroughly. Then the filtrate was quantitatively rinsed to a volumetric flask with distilled water and filled up to 1000.0 ml at 20° C.

The thus obtained filtrate was then slowly titrated by pipetting 10.00 mL of the obtained filtrate (about 20° C.) into a Memotitrator-beaker and 1.0 g (±0.2 g) of triethanolamine puris, and 3.0 g of $MgSO_4 \times 7\ H_2O$. The mixture was diluted with demineralized water up to 70 mL and then, just before the titration, 10.0 mL of 2N sodium hydroxide and 7 to 9 drops of a HHSNN-methanol solution (0.2 wt.-% of HHSNN in methanol) were added to the mixture. After the pre-dosing, the titrator stirred the mixture for 60 s and then the phototrode voltage was set to 900 to 1150 mV during titration. The calcium carbonate content was displayed in percent.

Examples

These examples which are not limitative, describe the preparation of a comparative sample of a medium-density fiber (MDF) board as available in the prior art as well as a medium-density fiber (MDF) board according to the present invention.

Test 1

The present test shows the influence of the replacement of fibers with a calcium carbonate-containing material on mechanical properties of a medium-density fiber (MDF) board. The comparative medium-density fiber (MDF) board is characterized in that the board only comprises fibers, i.e. fibers are not replaced by a calcium carbonate-containing material.

The fibers were made from 100% pine wood chips and were broken down in a refiner at 9 bar. After refining, the fibers were analyzed by sieve analysis. The composition of the fibers is outlined in Table 1.

TABLE 1

Composition of the fibers

| Sieve mash width [mm] | Total sum of passage fractionation [%] |
|---|---|
| 0.05 | 7.11 |
| 0.2 | 33.61 |
| 0.315 | 55.88 |
| 0.63 | 73.81 |
| 1.0 | 86.08 |
| 1.6 | 91.86 |
| 2.0 | 96.91 |
| 3.0 | 100 |

The obtained fibers were then mixed in a paddle mixer and 10.0 parts by weight (d/d), based on the total dry weight of fibers, of an urea-formaldehyde binder (Kaurit 350 of BASF AG, Germany) together with 0.5 parts by weight (d/d), based on the total dry weight of fibers, of a wax (Hydrowax 138 of SASOL GmbH, Germany) were added to the fibers. The resin-impregnated fibers were then formed into a mat and prepressed under room temperature. The prepressed mat was then pressed into a solid board of 17.5 mm thickness at a temperature of 220° C. with a pressing time factor of 12 s/mm. The obtained mat was then sanded to a thickness of 17 mm.

In contrast thereto, the inventive medium-density fiber (MDF) board is characterized in that fibers in an amount of 3.0 parts by weight (d/d) and 10.0 parts by weight (d/d), based on the total dry weight of the fibers in the comparative sample, respectively, are replaced by a calcium carbonate-containing material in an amount of 3.0 parts by weight (d/d) and 10.0 parts by weight (d/d), based on the total dry weight of the fibers in the comparative sample, respectively. Thus, the fiber-calcium carbonate-containing material mixture used for preparing the inventive medium-density fiber (MDF) boards consists of 90.0 parts by weight (d/d) of fiber and 10.0 parts by weight (d/d) of the calcium carbonate-containing material, based on the total dry weight of the fibers and the at least one particulate calcium carbonate-containing material, or the fiber-calcium carbonate-containing material mixture used for preparing the inventive medium-density fiber (MDF) boards consists of 97.0 parts by weight (d/d) of fiber and 3.0 parts by weight (d/d) of the calcium carbonate-containing material, based on the total dry weight of the fibers and the at least one particulate calcium carbonate-containing material.

The fibers were made from 100% pine wood chips and were broken down in a refiner at 9 bar as described above for the comparative board. The details regarding the fibers are outlined in Table 1 above. The fibers in an amount of 97.0 or 90.0 parts by weight (d/d), based on the total dry weight of the fibers for the comparative board, were mixed in a paddle mixer and 10.0 parts by weight (d/d), based on the total dry weight of the fibers and the at least one particulate calcium carbonate-containing material, of an urea-formaldehyde binder (Kaurit 350 of BASF AG, Germany) together with 0.5 parts by weight (d/d), based on the total dry weight of the fibers and the at least one particulate calcium carbonate-containing material, of a wax (Hydrowax 138 of SASOL GmbH, Germany) were added to the fibers.

It is to be noted that the amount of the binder and the wax is based on the total dry weight of the fibers and the at least one particulate calcium carbonate-containing material for the inventive board. As the amount of fibers and the calcium carbonate-containing material in the inventive board is the same as the amount of fibers in the comparative board, the amount of binder and wax used is thus the same for the inventive as well as comparative medium-density fiber (MDF) boards.

Subsequently, a calcium carbonate-containing material was added in an amount of 3.0 parts by weight (d/d) or 10.0 parts by weight (d/d), based on the total dry weight of the fibers for the comparative sample, respectively, to the resin-impregnated fibers and thoroughly mixed in the paddle mixer. As described for the comparative board, the resin-impregnated fiber-calcium carbonate-containing material mixture was then formed into a mat and prepressed under room temperature. The prepressed mat was then pressed into a solid board of 17.5 mm thickness at a temperature of 220° C. with a pressing time factor of 12 s/mm. The obtained mat was then sanded to a thickness of 17 mm.

Inventive samples as described above were prepared by using three different calcium carbonate-containing materials:

$CaCO_3$ A: Omyacarb® 1 AL, in the form of a powder (99 wt.-% calcium carbonate content), is a limestone from the Blaubeuren (Germany) deposit and was obtained from Omya. Omyacarb® 1 AL has a weight median particle size $d_{50}$ value of 2.0 μm.

$CaCO_3$ B: Omyacarb® 10 AL, in the form of a powder (98.5 wt.-% calcium carbonate content), is a limestone from the Blaubeuren (Germany) deposit and was obtained from Omya. Omyacarb® 10 AL has a weight median particle size $d_{50}$ value of 7.2 μm.

$CaCO_3$ C: Omyacarb® 40 AL, in the form of a powder (97.1 wt.-% calcium carbonate content), is a limestone from the Blaubeuren (Germany) deposit and was obtained from Omya. Omyacarb® 40 AL has a weight median particle size $d_{50}$ value of 30 μm.

The details regarding the fiber and fiber replacement content for the comparative and inventive MDF boards are also summarized in Table 2.

TABLE 2

Fiber and fiber replacement content for the comparative sample (CE) and inventive samples 1 to 6 (IE1 to IE6)

|  | Reference (CE) | IE1 3.0 pbw FR* by CaCO$_3$ | IE2 10.0 pbw FR* by CaCO$_3$ | IE3 3.0 pbw FR* by CaCO$_3$ | IE4 10.0 pbw FR* by CaCO$_3$ | IE5 3.0 pbw FR* by CaCO$_3$ | IE6 10.0 pbw FR* by CaCO$_3$ |
|---|---|---|---|---|---|---|---|
| Fiber [parts by weight] | 100 | 97.0 | 90.0 | 97.0 | 90.0 | 97.0 | 90.0 |
| CaCO$_3$ A [parts by weight] | — | 3.0 | 10.0 | — | — | — | — |
| CaCO$_3$ B [parts by weight] | — | — | — | 3.0 | 10.0 | — | — |
| CaCO$_3$ C [parts by weight] | — | — | — | — | — | 3.0 | 10.0 |
| Σ | 100.0 | 100.0 | 100.0 | 100.0 | 100.0 | 100.0 | 100.0 |

*FR, fiber replacement in parts by weight (pbw), based on 100.0 parts by weight of dry fibers before the replacement.

Figure 2:
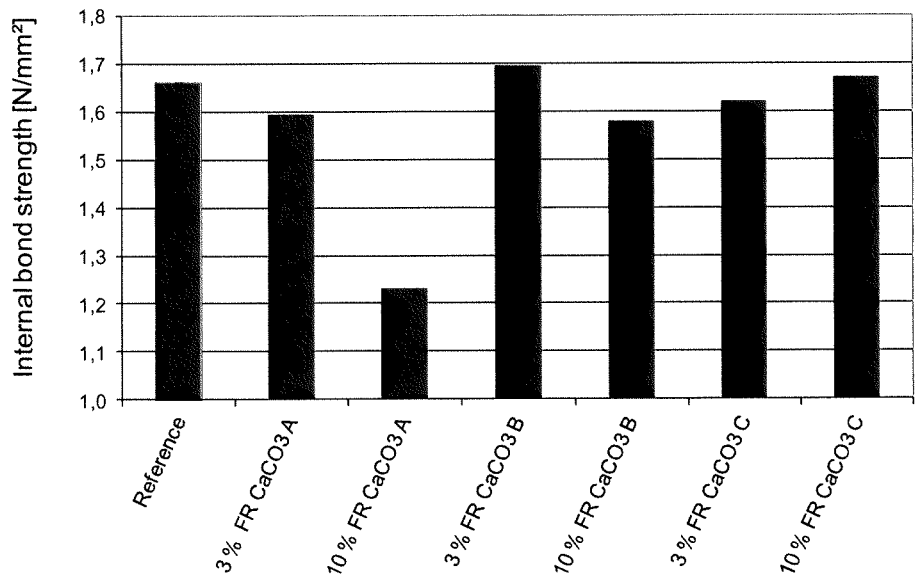
FIG. 2: Plot of internal bond strength for various $CaCO_3$ fiber replacement boards and reference.
Figure 3:
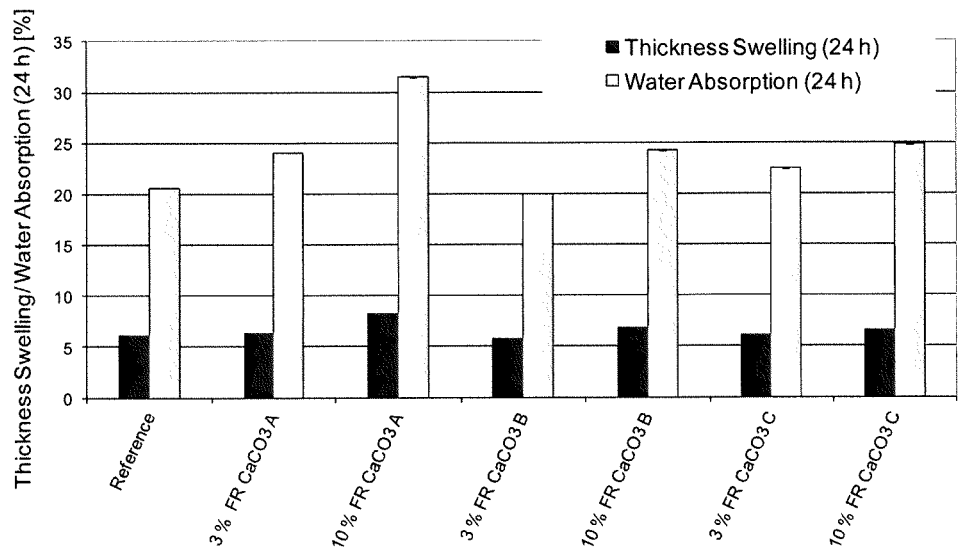
FIG. 3: Plot of thickness swelling/water absorption for various $CaCO_3$ fiber replacement boards and reference.

The results of the inventive MDF boards compared to the comparative MDF board with regard to the bending strength, internal bond strength and thickness swelling are outlined in FIG. 1 to 3.

From FIG. 1 to 3, it can be gathered that the replacement of fibers by a calcium carbonate-containing material leads to medium-density fiber (MDF) boards having mechanical properties which are maintained or even increased compared to the comparative sample. In particular, it is shown that a MDF board in which 3 parts by weight (d/d) of fibers were replaced by calcium carbonate has a higher bending strength than the comparative sample (FIG. 1). Furthermore, it can be gathered that the replacement of fibers with a calcium carbonate-containing material also leads to a comparative or even higher internal bond strength compared to the comparative sample (FIG. 2). In addition thereto, it is shown in FIG. 3 that the thickness swelling can be maintained by replacing fibers with a calcium carbonate-containing material. In addition thereto, it can be gathered from FIGS. 1 and 2 that e.g. the bending strength and the Internal bond strength can be significantly improved if the fibers in the MDF board are replaced with a high amount, i.e. 10 parts by weight (d/d), based on the total dry weight of the fibers and the at least one particulate calcium carbonate-containing material, of a calcium carbonate-containing material having a high weight median particle size d$_{50}$ value.

Test 2

The present test shows the influence of the separate or simultaneous addition of the binder during the preparation of a medium-density fiber (MDF) board in the blowline system.

Fibers were prepared and broken down as described in test 1. The details regarding the fibers are outlined in Table 1 above.

For the comparative medium-density fiber (MDF) board, i.e. the fibers are not replaced by a calcium carbonate-containing material, an urea-formaldehyde binder (Kaurit 350 of BASF AG, Germany) in an amount of 15.0 parts by weight (d/d), based on the total dry weight of the fibers, together with 0.5 parts by weight (d/d), based on the total dry weight of the fibers, of a wax (Hydrowax 138 of SASOL GmbH, Germany) were sprayed on the fibers through a blowline system. The solid content in the binder was 50.0 wt.-%, based on the total weight of the binder. The resin-impregnated fibers were then predried in a continuous dryer to a residual moisture content of 9.0 wt.-%, based on the total dry weight of the fibers, and formed into a mat and prepressed under room temperature. The prepressed mat was then pressed into a solid board of 17.5 mm thickness at a temperature of 220° C. with a pressing time factor of 12 s/mm. The obtained mat was then sanded to a thickness of 17 mm.

In contrast thereto, the inventive medium-density fiber (MDF) board is characterized in that fibers in an amount of 10.0 parts by weight (d/d), based on the total dry weight of the fibers in the comparative sample, are replaced by a calcium carbonate-containing material in an amount of 10.0 parts by weight (d/d), based on the total dry weight of the fibers in the comparative sample. Thus, the fiber-calcium carbonate-containing material mixture used for preparing the inventive medium-density fiber (MDF) boards consists of 90.0 parts by weight (d/d) of fiber and 10.0 parts by weight (d/d) of the calcium carbonate-containing material, based on the total dry weight of the fibers and the at least one particulate calcium carbonate-containing material.

The fibers were made from 100.0% pine wood chips and were broken down in a refiner at 9 bar as described above for the comparative board in test 1. The details regarding the fibers are outlined in Table 1 above.

The urea-formaldehyde binder (Kaurit 350 of BASF AG, Germany) in an amount of 15.0 parts by weight (d/d), based on the total dry weight of the fibers and the at least one particulate calcium carbonate-containing material, together with 0.5 parts by weight (d/d), based on the total dry weight of the fibers and the at least one particulate calcium carbonate-containing material, of a wax (Hydrowax 138 of SASOL GmbH, Germany), and 10.0 parts by weight (d/d), based on the total dry weight of the fibers in the comparative sample, of a calcium carbonate-containing material were sprayed on the fibers through a blowline system.

The inventive sample was prepared by using the following calcium carbonate-containing material:

CaCO$_3$ D: Omyacarb® 10 GU, in the form of a powder (98 wt.-% calcium carbonate content), is a marble from the Gummern (Austria) deposit and was obtained from Omya. Omyacarb® 10 GU has a weight median particle size d$_{50}$ value of 7.5 μm.

The calcium carbonate-containing material was sprayed on the fibers before or during or after the binder in the blowline systems. If the calcium carbonate-containing material was added to the fibers during the addition of the binder, the calcium carbonate-containing material and the binder were added as blend such that they were simultaneously sprayed on the fibers, i.e. in form of an aqueous slurry. If the calcium carbonate-containing material and the binder were added as a blend, the aqueous slurry comprising the calcium carbonate-containing material and the binder had solids content of 50.0 wt.-%, based on the total weight of the slurry.

If the calcium carbonate-containing material was added to the fibers before or after the addition of the binder, the calcium carbonate-containing material was added in the form of an aqueous slurry such that the binder and the calcium carbonate-containing material were separately sprayed on the fibers. The aqueous slurry of the calcium carbonate-containing material had solids content of 68.0 wt.-%, based on the total weight of the slurry.

The resin-impregnated fiber-calcium carbonate-containing material mixture was then predried in a continuous dryer to a residual moisture content of 9.0 wt.-%, based on the total dry weight of the fibers, and formed into a mat and prepressed under room temperature. The prepressed mat was then pressed into a solid board of 17.5 mm thickness at a temperature of 220° C. with a pressing time factor of 12 s/mm. The obtained mat was then sanded to a thickness of 17 mm.

Figure 4:
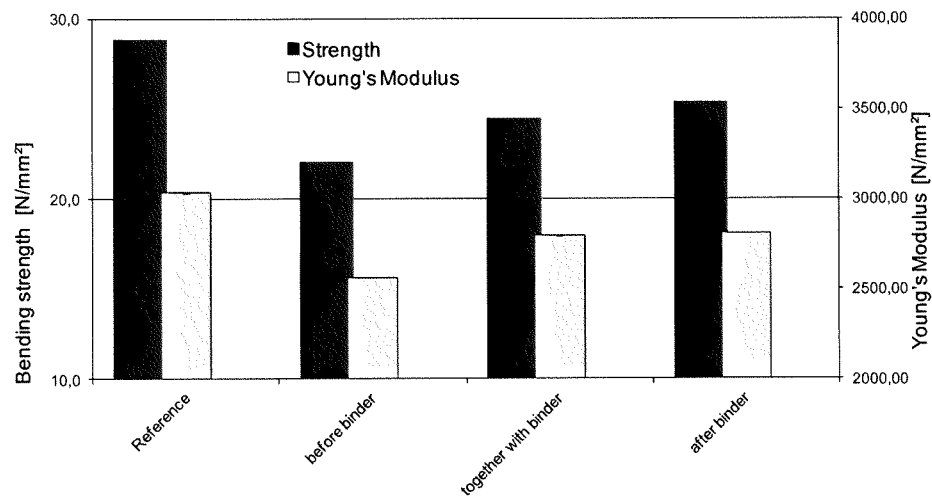
FIG. 4: Plot of binding strength and Young's Modulus for adding binder and calcium carbonate-containing material simultaneously or separately before or after.
Figure 5:
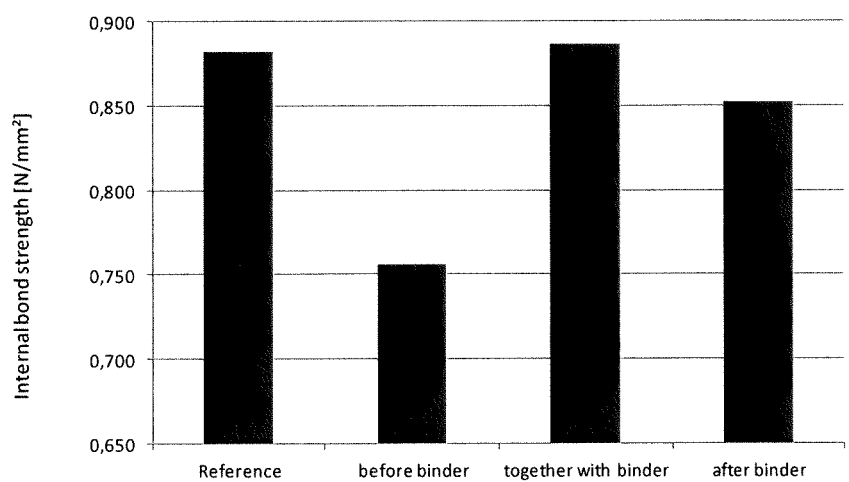
FIG. 5: Plot of internal bond strength and Young's Modulus for adding binder and calcium carbonate-containing material simultaneously or separately before or after.

The results of the inventive MDF board compared to the comparative MDF board with regard to the bending strength and internal bond strength observed by adding the binder and the calcium carbonate-containing material simultaneously or separately are outlined in FIGS. 4 and 5.

From FIGS. 4 and 5, it can be gathered that the point of adding the binder and the calcium carbonate-containing material during the manufacturing of a medium-density fiber (MDF) board influences the mechanical properties of the fiber board product. In particular, it is shown that the addition of the calcium carbonate-containing material during or after the binder increases the bending strength compared to the sample in which the calcium carbonate-containing material is added before the binder (FIG. 4). Furthermore, it can be gathered that the internal bond strength can be even increased compared to the comparative sample, if the calcium carbonate-containing material and the binder are sprayed simultaneously on the fibers (FIG. 5).

The invention claimed is:

1. A fiber board product comprising
   a) fibers in an amount from 50.0 to 99.0 parts by weight (d/d), based on the total dry weight of the fibers and at least one particulate calcium carbonate-containing material, wherein the fibers in an amount of
      i) 0 to 20.0 wt.-%, based on the total amount of dry fibers, are of a size which is fractioned at a mesh sieve width of 0.05 mm,
      ii) 50.0 to 90.0 wt.-%, based on the total amount of dry fibers, are of a size which is fractioned at a mesh sieve width of 1.0 mm, and
      iii) 70.0 to 100.0 wt.-%, based on the total amount of dry fibers, are of a size which is fractioned at a mesh sieve width of 3.0 mm, as determined by sieve analysis,
   b) at least one particulate calcium carbonate-containing material in an amount from 1.0 to 50.0 parts by weight (d/d), based on the total dry weight of the fibers and the at least one particulate calcium carbonate-containing material, the at least one particulate calcium carbonate-containing material having a weight median particle size $d_{50}$ of 0.5 to 150.0 µm,
   c) at least one binder in an amount from 0.05 to 25.0 parts by weight (d/d), based on the total dry weight of the fibers and the at least one particulate calcium carbonate-containing material, and
   d) at least one wax in an amount from 0 to 5.0 parts by weight (d/d), based on the total dry weight of the fibers and the at least one particulate calcium carbonate-containing material,
   wherein the sum of the amount of the fibers and the at least one particulate calcium carbonate-containing material is 100.0 parts by weight (d/d), based on the total dry weight of the fibers and the at least one particulate calcium carbonate-containing material.

2. The fiber board product according to claim 1, wherein the at least one particulate calcium carbonate-containing material is selected from the group consisting of dolomite, at least one ground calcium carbonate (GCC), at least one precipitated calcium carbonate (PCC), and any mixture thereof.

3. The fiber board product according to claim 1, wherein the at least one particulate calcium carbonate-containing material is ground calcium carbonate (GCC) selected from the group consisting of marble, chalk, limestone, and any mixture thereof.

4. The fiber board product according to claim 1, wherein the at least one particulate calcium carbonate-containing material is d precipitated calcium carbonate (PCC) comprising one or more of aragonitic, vateritic and calcitic mineralogical crystal forms.

5. The fiber board product according to claim 1, wherein the at least one particulate calcium carbonate-containing material has a) a weight median particle size $d_{50}$ from 0.7 µm to 100.0 µm, and/or b) a specific surface area of from 0.5 to 200.0 m$^2$/g, as measured by the BET nitrogen method.

6. The fiber board product according to claim 1, wherein the at least one particulate calcium carbonate-containing material has a) a weight median particle size $d_{50}$ from 1.0 µm to 50.0 µm, and/or b) a specific surface area of from 0.5 to 100.0 m$^2$/g, as measured by the BET nitrogen method.

7. The fiber board product according to claim 1, wherein the at least one particulate calcium carbonate-containing material has a) a weight median particle size $d_{50}$ from 2.1 µm to 40.0 µm, and/or b) a specific surface area of from 0.5 to 50.0 m$^2$/g, as measured by the BET nitrogen method.

8. The fiber board product according to claim 1, wherein the at least one particulate calcium carbonate-containing material consists of calcium carbonate in an amount of ≥50.0 wt.-%, based on the total dry weight of the calcium carbonate-containing material.

9. The fiber board product according to claim 1, wherein the at least one particulate calcium carbonate-containing material consists of calcium carbonate in an amount of ≥90.0 wt.-%, based on the total dry weight of the calcium carbonate-containing material.

10. The fiber board product according to claim 1, wherein the at least one particulate calcium carbonate-containing material consists of calcium carbonate in an amount of ≥95.0 wt.-%, based on the total dry weight of the calcium carbonate-containing material.

11. The fiber board product according to claim 1, wherein the at least one particulate calcium carbonate-containing material consists of calcium carbonate in an amount of ≥97.0 wt.-%, based on the total dry weight of the calcium carbonate-containing material.

12. The fiber board product according to claim 1, wherein the fibers originate from softwood tree species, hardwood tree species, non-wood fiber plants, and any mixture thereof.

13. The fiber board product according to claim 1, wherein the fiber board product comprises a fiber material consisting of the fibers and the at least one particulate calcium carbonate-containing material having a weight fraction of fibers in said fiber material from 99.0 to 50.0 wt.-%, based on the total dry weight of the fibers and the at least one particulate calcium carbonate-containing material.

14. The fiber board product according to claim 1, wherein the fiber board product comprises a fiber material consisting of the fibers and the at least one particulate calcium carbonate-containing material having a weight fraction of fibers in said fiber material from 99.0 to 75.0 wt.-%, based on the total dry weight of the fibers and the at least one particulate calcium carbonate-containing material.

15. The fiber board product according to claim 1, wherein the fiber board product comprises a fiber material consisting of the fibers and the at least one particulate calcium carbonate-containing material having a weight fraction of fibers in said fiber material from 99.0 to 80.0 wt.-%, based on the total dry weight of the fibers and the at least one particulate calcium carbonate-containing material.

16. The fiber board product according to claim 1, wherein the fiber board product comprises a fiber material consisting of the fibers and the at least one particulate calcium carbonate-containing material having a weight fraction of fibers in said fiber material from 97.0 to 88.0 wt.-%, based on the total dry weight of the fibers and the at least one particulate calcium carbonate-containing material.

17. The fiber board product according to claim 1, wherein the fiber board product comprises the fibers in an amount from 75.0 to 99.0 parts by weight (d/d) and the at least one particulate calcium carbonate-containing material in an amount from 1.0 to 25.0 parts by weight (d/d), based on the total dry weight of the fibers and the at least one particulate calcium carbonate-containing material.

18. The fiber board product according to claim 1, wherein the at least one binder is selected from the group consisting of phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), and any mixture thereof.

19. The fiber board product according to claim 1, wherein the fiber board product further comprises at least one compound selected from the group consisting of colorants, filler, dispersants, biocides, hardener, and flame retardants.

20. The fiber board product according to claim 1, wherein the fiber board product has a density from 35 to 1100 kg/m$^3$, and/or a thickness from 1.0 to 300.0 mm.

21. The fiber board product according to claim 1, wherein the fiber board product has a density from 250 to 900 kg/m$^3$, and/or a thickness from 2.0 to 40.0 mm.

22. The fiber board product according to claim 1, wherein the fiber board product has a density from 600 to 800 kg/m$^3$, and/or a thickness 4.0 to 20 mm.

23. A process for manufacturing a fiber board product according to claim 18, comprising the steps of:
a) providing the fibers, in dry form or in form of an aqueous suspension,
b) providing the at least one particulate calcium carbonate-containing material,
c) providing the at least one binder, and optionally at least one wax,
d) combining the fibers of step a) simultaneously or separately in any order with the at least one particulate calcium carbonate-containing material of step b) and the at least one binder and the optional at least one wax of step c) to form a resin-impregnated fiber-calcium carbonate-containing material mixture,
e) forming a mat from the resin-impregnated fiber-calcium carbonate-containing material mixture, and
f) pressing the mat into a solid fiber board product.

24. The process according to claim 23, wherein process step d) is carried out in that the fibers are combined simultaneously with the at least one particulate calcium carbonate-containing material of step b) and the at least one binder and the optional at least one wax of step c).

25. The process according to claim 23, wherein process step d) is carried out in that the fibers are combined separately with the at least one particulate calcium carbonate-containing material of step b) and the at least one binder and the optional at least one wax of step c).

26. The process according to claim 23, wherein process step d) is carried out in that the fibers are first combined with the at least one binder and the optional at least one wax of step c) and then with the at least one particulate calcium carbonate-containing material of step b).

27. The process according to claim 23, wherein the at least one particulate calcium carbonate-containing material is provided:
a) in powder form, or
b) in form of an aqueous slurry comprising the calcium carbonate-containing material in an amount from 1.0 to 80.0 wt.-%, based on the total weight of the aqueous slurry.

28. The process according to claim 23, wherein the at least one particulate calcium carbonate-containing material is provided in form of an aqueous slurry comprising the calcium carbonate-containing material in an amount from 30.0 to 78.0 wt.-%, based on the total weight of the aqueous slurry.

29. The process according to claim 23, wherein the at least one particulate calcium carbonate-containing material is provided in form of an aqueous slurry comprising the calcium carbonate-containing material in an amount from 50.0 to 78.0 wt.-%, based on the total weight of the aqueous slurry.

30. The process according to claim 23, wherein the at least one particulate calcium carbonate-containing material is provided in form of an aqueous slurry comprising the calcium carbonate-containing material in an amount from 70.0 to 78.0 wt.-%, based on the total weight of the aqueous slurry.

31. The process according to claim 23, wherein process step d) is carried out in a blowline system and/or a blender.

32. The process according to claim 31, wherein combining of the fibers with the at least one particulate calcium carbonate-containing material in process step d) is carried out before or during or after the addition of the at least one binder and the optional at least one wax in the blowline system and/or blender.

33. The process according to claim 31, wherein combining of the fibers with the at least one particulate calcium carbonate-containing material in process step d) is carried out during or after the addition of the at least one binder and the optional at least one wax in the blowline system and/or blender.

* * * * *